United States Patent
Woo et al.

[15] 3,692,746
[45] Sept. 19, 1972

[54] INTERPOLYMERS OF VINYLIDENE CHLORIDE AND BLOCKED VINYL ISOCYANATES AND PROCESS FOR COATING ARTICLES THEREWITH

[72] Inventors: James T. K. Woo, Jr., Thayer A. Brown, both of Midland, Mich.

[73] Assignee: The Dow Chemical Company Midland, Mich.

[22] Filed: Nov. 30, 1970

[21] Appl. No.: 93,885

[52] U.S. Cl........260/77.5 TB, 117/62, 117/138.8 A, 117/138.8 E, 117/138.8 F, 117/138.8 N, 117/138.8 PV, 117/138.8 UA, 117/145, 117/148, 117/155 R, 260/77.5 BB
[51] Int. Cl..............................................C08q 22/32
[58] Field of Search.................260/77.5 BB, 77.5 TB

[56] References Cited

UNITED STATES PATENTS 2,483,194    9/1949    Gleim..................260/77.5 BB

*Primary Examiner*—Donald E. Czaja
*Assistant Examiner*—M. J. Welsh
*Attorney*—Griswold & Burdick, Ronald G. Brookens and Albin R. Lindstrom

[57] ABSTRACT

This invention relates to polymer compositions, coated articles and processes, and more particularly, to interpolymers of vinylidene chloride and vinyl isocyanates having blocked isocyanate functionalities which interpolymers provide improved coatings on a wide variety of substrate material.

4 Claims, No Drawings

INTERPOLYMERS OF VINYLIDENE CHLORIDE AND BLOCKED VINYL ISOCYANATES AND PROCESS FOR COATING ARTICLES THEREWITH

BACKGROUND

The copolymerization of vinyl and vinylidene compounds with vinyl isocyanates for the preparation of coating compositions is known, e.g., as disclosed in U.S. Pat. No. 2,326,287.

Because they are durable, flexible, strong, odorless, transparent, heat-sealable and inherently moisture-resistant, thin coatings of vinylidene chloride interpolymers containing at least about 70 weight percent of vinylidene chloride recommend themselves for the coating of essentially smooth surfaces such as regenerated cellulose, oriented polypropylene, and polyethylene terephthalate film and the like. Coatings of such vinylidene chloride interpolymers generally have excellent moistureproofness but their adhesion to the base film or other articles under high moisture conditions is very poor. In order to improve the adhesion, it is commonly necessary to first apply an anchoring subcoating and then a vinylidene chloride interpolymer coating; which represents a costly and time consuming step, and hence a commercial disadvantage.

Heretofore, the preparation of self-anchoring and/or cross-linkable coating compositions based on interpolymers of vinylidene chloride and vinyl isocyanates, e.g., for coating regenerated cellulose and polyethylene terephthalate and the like, has not been possible due to the pronounced moisture sensitivity of such interpolymers resulting from the reactivity of the isocyanate groups with proton donors present in solutions or dispersions comprising such coating compositions.

The primary object of this invention is, therefore, to provide moistureproof, heat-sealable, transparent coatings of interpolymers of vinylidene chloride and vinyl isocyanates, which interpolymers strongly adhere directly to essentially smooth base materials such as regenerated cellulose film and the like, even when the coated base material is maintained in an atmosphere of high moisture content or in direct contact with water for a considerable period of time.

Another object is to provide an essentially smooth article having in direct contact therewith a well adhered moistureproof transparent coating of such vinylidene chloride interpolymer.

Other and related objects will become evident from the following specification and claims.

SUMMARY OF THE INVENTION

The above and related objects are accomplished, according to the invention, by coating a base material, as further described herein, by any convenient coating technique, with an interpolymer consisting essentially of (1) at least about 70 weight percent vinylidene chloride, (2) between about 1 and 15 weight percent of a vinyl isocyanate containing blocked isocyanate functionalities and (3) the remainder being one or more copolymerizable ethylenically unsaturated monomers.

DESCRIPTION OF THE PREFERRED EMBODIMENTS

Vinyl isocyanates containing blocked isocyanate functionalities are described by F. H. Saunders and K. C. Frisch, in Polyurethanes Chemistry and Technology, Part I Chemistry, Volume 16 High Polymers, Interscience, 1966, page 120; and in an article by G. R. Griffin and L. F. Willwerth, entitled "The Thermal Dissociation of Blocked Toluene Diisocyanates," Product Research and Development, Industrial Engineering and Chemistry, Volume 1, number 4, December 1962.

Illustrative of the blocked vinyl isocyanates which have been found to be particularly useful for the purposes of the present invention are the materials having the general structure:

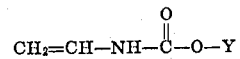

where Y is

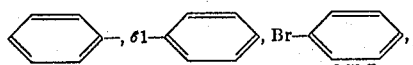

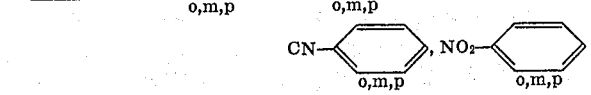

distributed up to pentasubstituted; and

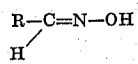

where
R is alkyl or aryl.

Although the blocked vinyl isocyanates may be used in any amount which does not significantly interfere with the desired barrier or other properties of the coating composition, preferred additive concentrations range from about 1 to about 15 weight percent based on composition weight.

The copolymerizable ethylenically unsaturated monomers which may be used include but are not restricted to, methyl methacrylate, ethyl methacrylate, butyl methacrylate, octyl methacrylate, n-dodecyl methacrylate, n-octadecyl methacrylate, methyl acrylate, ethyl acrylate, propyl acrylate, butyl acrylate, phenyl methacrylate, cyclohexyl methacrylate, p-cyclohexylphenyl methacrylate and hydroxyl derivatives thereof, particularly where cross-linking is desired; acrylonitrile and methacrylonitrile; methyl vinyl ketone; vinyl chloride; acrylic acid, methacrylic acid, itaconic acid, and mixtures thereof.

The monomers may be copolymerized by any known method to form the interpolymers useful for the present invention. For example, the copolymerization may be conducted in aqueous emulsions containing a catalyst, e.g., potassium persulfate and any of the well known emulsifying and/or dispersing agents. Alternatively, the interpolymers may be prepared by polymerization of the monomeric components in bulk without added diluent, or the monomers may be reacted in appropriate organic solvent reaction media.

While there is no critical order of addition of the various components of the monomeric mixture to be polymerized, a convenient manner of carrying out the process is to mix the adduct of vinyl isocyanate with the remaining monomers in an aqueous medium containing the catalyst. The various components of the monomeric mixture to be polymerized can also conveniently be premixed and added to the aqueous medium containing the catalyst.

The terpolymers useful for the present invention are applied as coatings by any suitable technique as, e.g., organic solvent solutions or from aqueous emulsion.

Any sheet or film or other article susceptible to being coated with a vinylidene chloride copolymer may be used for the purposes of this invention. Because of their commercial importance however, regenerated cellulose and polyethylene terephthalate film constitute preferred base materials. Other suitable base materials are: films or sheets of polyethylene, oriented polypropylene, polyvinyl alcohol, casein, various polyamides such as polyhexamethylene adipamide among others; various cellulose esters such as cellulose acetate, cellulose nitrate, and cellulose acetate butyrate; polyvinyl acetals; vinyl combinations such as polyvinyl chloride/polyvinyl acetate copolymers; fibrous cellulosic materials such as tissue paper, book papers, crepe paper, wrapping paper, cardboard, chipboard, wallboard and the like; metals such as steel, aluminum and tin among many others; wood products such as plywood; textiles such as cotton textiles and fabrics; other vegetable fiber products; and other substrata which are relatively insoluble in the coating solutions of the present invention. On the other hand, the coating systems of the present invention can also be used to cast unsupported films of the vinylidene chloride copolymer disclosed herein.

The coating compositions of the invention may additionally suitably contain conventional dyes, pigments, lubricants, waxes, light and heat stabilizers, and so forth, as necessary or desired for particular applications, without adversely affecting the desirable properties of the material.

The following example, wherein all parts and percentages are to be taken by weight, illustrates the present invention but is not to be construed as limiting its scope.

EXAMPLE

A. Preparation of Phenyl Vinylcarbamate 15 gms. of phenol was dissolved in 150 ml. of anhydrous ether and 50 mg NaH added. Thereafter, 16 ml. of vinyl isocyanate was slowly added and the ether evaporated leaving a white solid which was washed with dilute NaOH and then with water. The washed product was then dried overnight at room temperature under vacuum.

B. Preparation of Benzophenone-O-(Vinylcarbamoyl)-Oxime 30 gms. (0.157 mole) of the benzophenone oxime was dissolved in 150 cc of tetrahydrofuran. 16 gms. (0.23 mole) of vinyl isocyanate(stabilized with dimethoxy propane and filtered before use) was slowly added to the tetrahydrofuran solution. Reaction exotherm was observed and a cold water bath was placed around the reaction flask. After the addition of vinyl isocyanate, the reaction mixture was stirred for 2 hours at room temperature and placed in the freezer for 3 days. There was no solid product formed at the end of that time. The solvent was stripped under vacuum to give a solid which was dried under vacuum at room temperature for overnight. The off-white solid has a m.p. of 89° C. Yield was 95 percent. The nuclear magnetic resonance (N.M.R.) spectrum of the product was consistent with the assigned structure.

C. Preparation of Acetone-O-(Vinylcarbamoyl)-Oxime 40.4 gms. (0.553 mole) of the acetone oxime was dissolved in 150 cc of tetrahydrofuran. 46.7 gms. (0.677 mole) of a freshly distilled vinyl isocyanate was added slowly to the stirred solution of oxime. After the addition the excess solvent was stripped off under vacuum and the resulting thick oil was placed in the freezer to give a solid product which was dried under vacuum overnight. The N.M.R. spectrum of the product was consistent with the assigned structure.

D. Polymerization of an Interpolymer of Vinylidene Chloride and Phenyl Vinyl-carbamate 300 gms water, 4.1 gms. of a salt of an anionic surfactant, 10 gms. of the dihexyl ester of sodium sulfosuccinic acid and 0.5 gms. of acetic acid were loaded in a 2-liter glass pipe pressure reactor fitted with a temperature controller, stirrer, inlet port, etc. The mixture was stirred, evacuated, and then pressurized with 5 lbs. $N_2$ and then heated to 40° C. After the reactor reached a temperature of 40° C, 2 streams were pumped in over a 5 hour period. One stream consisted of 900 gms. water, 4.1 gms. of an anionic surfactant, 5 gms. of the dihexyl ester of sodium sulfosuccinic acid and 0.4 gms. sodium formaldehyde hydrosulfite. The other stream consisted of 720 gms. vinylidene chloride, 56 gms. methyl methacrylate, 106.5 gms. phenyl vinylcarbamate and 0.26 gms. cumene hydroperoxide. After 5 hours of continuous addition, the resulting latex was cooled to 30° C and removed from the reactor. The latex was coagulated with electrolyte, washed with water and air dried.

E. Coating and Evaluation of the Vinylidene Chloride Coating Composition on Regenerated Cellulose The dried resin was dissolved at 10 percent solids in tetrahydrofuran and coated on individual cellophane substrates, as hereinafter identified, using a convention wire wound rod. The coated samples were all first dried for 3 minutes at 120° C. Several samples were then additionally cured for 30 minutes at 130° C. All samples were then exposed for 16 hours at 100° F at 93 percent relative humidity. Coating adhesion was measured by stripping the coating from 1-inch strips of the cellophane on an Instron machine.

The following Table I sets forth the testing results:

TABLE I

| Coating Designation | Cellophane Designation | |
|---|---|---|
| | Type PT[1] | Type MSBO[2] |
| Uncured | 3 | 19.5 |
| Cured | 6.5 | 63.6 |

[1] No anchor coating
[2] Anchor coated

By way of comparison when vinyl isocyanate is used as a replacement for the phenyl vinylcarbamate in the above technique, cross-linked, insoluble polymer is obtained.

Similar improved results as described herein were obtained using benzophenone-O-(vinylcarbamoyl) oxime or acetone-O-(vinylcarbamoyl) oxime as the blocked vinyl isocyanate when such coating compositions were applied to regenerated cellulose.

Similar improvements were also obtained when applying the vinylidene chloride interpolymer coating compositions of the present invention to a polyethylene terephthalate film in the preparation of magnetic tapes.

What is claimed is:

1. Interpolymers consisting essentially of (1) at least about 70 weight percent of vinylidene chloride, (2) between about 1 and 15 weight percent of a blocked vinyl isocyanate and (3) the remainder being one or more copolymerizable ethylenically unsaturated monomers.

2. The interpolymers of claim 1 wherein said blocked vinyl isocyanate is selected from the group consisting of the materials having the structure:

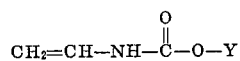

where Y is

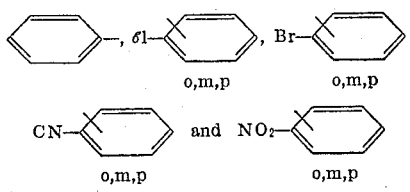

3. A process for preparing articles having a self-anchoring coating thereon comprising coating a substrate with an interpolymer consisting essentially of (1) at least about 70 weight percent of vinylidene chloride, (2) between about 1 and 15 weight percent of a blocked vinyl isocyanate and (3) the remainder being one or more copolymerizable ethylenically unsaturated monomers, then heating said coating to regenerate the isocyanate functionalities.

4. The process of claim 3 wherein said blocked vinyl isocyanate is selected from the group consisting of the materials having the structure:

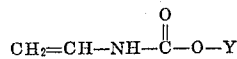

where Y is

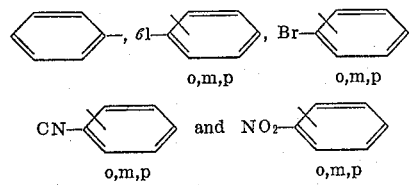

* * * * *